United States Patent
Wang et al.

(10) Patent No.: US 8,369,278 B2
(45) Date of Patent: *Feb. 5, 2013

(54) METHOD AND APPARATUS FOR SENDING CONTROL SIGNALING

(75) Inventors: Xianghua Wang, Shenzhen (CN); Xuan Feng, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,238

(22) Filed: Jul. 9, 2012

(65) Prior Publication Data

US 2012/0275368 A1 Nov. 1, 2012

Related U.S. Application Data

(63) Continuation of application No. 12/432,882, filed on Apr. 30, 2009, now Pat. No. 8,265,023, which is a continuation of application No. PCT/CN2008/070822, filed on Apr. 28, 2008.

(30) Foreign Application Priority Data

Apr. 27, 2007 (CN) .......................... 2007 1 0097679

(51) Int. Cl.
*H04W 72/04* (2009.01)
*H04J 3/24* (2006.01)
(52) U.S. Cl. ...... 370/329; 370/471; 370/252; 455/452.2
(58) Field of Classification Search .................. 370/252, 370/328, 329, 335, 336, 338, 342–343, 471; 455/450, 451, 452.1

See application file for complete search history.

(56) References Cited

U.S. PATENT DOCUMENTS

| | | | |
|---|---|---|---|
| 6,865,233 B1 | 3/2005 | Eriksson et al. | |
| 7,263,088 B2 | 8/2007 | Bui | |
| 7,283,508 B2 | 10/2007 | Choi et al. | |
| 7,301,929 B2 * | 11/2007 | Frederiksen et al. | 370/342 |
| 7,403,513 B2 * | 7/2008 | Lee et al. | 370/342 |
| 7,426,201 B2 | 9/2008 | Kim et al. | |
| 7,450,611 B2 | 11/2008 | Kim et al. | |
| 7,813,379 B2 * | 10/2010 | Kim | 370/477 |
| 7,948,932 B2 * | 5/2011 | Murata et al. | 370/328 |
| 2003/0157953 A1 | 8/2003 | Das et al. | |

(Continued)

FOREIGN PATENT DOCUMENTS

| | | |
|---|---|---|
| CN | 1336041 | 2/2002 |
| CN | 1347606 A | 5/2002 |

(Continued)

OTHER PUBLICATIONS

International Search Report from P.R. China in International Application No. PCT/CN2008/070822 mailed Aug. 14, 2008.

(Continued)

*Primary Examiner* — Kwang B Yao
*Assistant Examiner* — Candal Elpenord
(74) *Attorney, Agent, or Firm* — Finnegan, Henderson, Farabow, Garrett & Dunner, LLP

(57) ABSTRACT

A method for sending control signaling, including: a transmitter using different states of one field in the control signaling to indicate the payload size or RV; and sends the control signaling indicative of the payload size or RV in the field. It is appropriate that some states of one field indicate different payload sizes, and the remaining states of the field indicate different RVs. An apparatus for sending control signaling is disclosed. The apparatus may be integrated in a base station, and may include a control signaling generating unit and a control signaling sending unit.

9 Claims, 12 Drawing Sheets

U.S. PATENT DOCUMENTS

| | | |
|---|---|---|
| 2005/0048920 A1 | 3/2005 | Liu |
| 2007/0133458 A1 | 6/2007 | Chandra et al. |
| 2008/0056229 A1 | 3/2008 | Gholmeih et al. |
| 2008/0081651 A1 | 4/2008 | Kuroda et al. |

FOREIGN PATENT DOCUMENTS

| | | | |
|---|---|---|---|
| CN | 1472973 | A | 2/2004 |
| CN | 1700630 | | 11/2005 |
| CN | 1233181 | C | 12/2005 |
| EP | 2 015 602 | A1 | 1/2009 |
| EP | 2015602 | A1 | 1/2009 |
| WO | WO 2005/109727 | A1 | 11/2005 |
| WO | WO 2006/002658 | A1 | 1/2006 |
| WO | WO 2006/058173 | A2 | 6/2006 |
| WO | WO 2006/114710 | A2 | 11/2006 |
| WO | WO 2008/084989 | A2 | 7/2008 |
| WO | WO 2009/022822 | A2 | 2/2009 |

OTHER PUBLICATIONS

Extended European Search Report dated (mailed) Apr. 26, 2011, issued in related Application No. 08734180.6—2415, PCT/CN2008070822, filed Apr. 28, 2008, Huawei Technologies Co., Ltd.

Written Opinion of the International Searching Authority (translation) dated (mailed) Aug. 14, 2008, issued in related Application No. PCT/CN2008/070822, filed Apr. 28, 2008, Huawei Technologies Co., Ltd.

$3^{rd}$ Generation Partnership Project; "Technical Specification Group Radio Access Network; Physical layer procedures" (release 8) 3GPP TS 36.213 V1.0.0 (Mar. 2007).

Chinese Office Action dated Sep. 4, 2009, in related Chinese Application No. 2007100976790, English Translation.

Extended European Search Report dated (mailed) May 8, 2012, issued in related Application No. 12163016.4—2415 Huawei Technologies Co., Ltd.

U.S. Office Action issued in related Application No. 12/432,882; Xianghua Wang; dated Oct. 25, 2010; for Huawei Tech Co., Ltd.

U.S. Office Action issued in related Application No. 12/432,882; Xianghua Wang; dated Mar. 17, 2011; for Huawei Tech Co., Ltd.

U.S. Office Action issued in related Application No. 12/432,882; Xianghua Wang; dated Sep. 28, 2011; for Huawei Tech Co., Ltd.

U.S. Office Action issued in related Application No. 12/432,882; Xianghua Wang; dated Mar. 9, 2012; for Huawei Tech Co., Ltd.

EPO Extended European Search Report dated Sep. 6, 2012, issued in related European Application No. 12178466.4, Huawei Technologies Co., Ltd. (14 pages).

EPO Extended European Search Report dated Nov. 29, 2012, issued in related European Application No. 12178437.5, Huawei Technologies Co., Ltd. (14 pages).

* cited by examiner

METHOD AND APPARATUS FOR SENDING CONTROL SIGNALING

CROSS-REFERENCE TO RELATED APPLICATIONS

This application is a continuation of U.S. patent application Ser. No. 12/432,882, filed on Apr. 30, 2009 now U.S. Pat. No. 8,265,023, which is a continuation of International Application No. PCT/CN2008/070822, filed on Apr. 28, 2008. The International Application claims priority to Chinese Patent Application No. 200710097679.0, filed on Apr. 27, 2007. The afore-mentioned patent applications are hereby incorporated by reference in their entireties.

TECHNICAL FIELD

The present invention relates to radio communication technologies, and in particular, to a method and apparatus for sending control signaling.

BACKGROUND

In a radio communication system, by sending control signaling, a control signaling transmitter notifies the control signaling receiver (terminal) of the information on the physical resources and transmission format for transmitting data. The control signaling receiver uses such information to receive downlink transmitted data or send uplink transmitted data. For example, in a Time Division Duplex (TDD) and/or Frequency Division Duplex (FDD) system, the control signaling transmitter needs to notify the timeslot and/or frequency used for transmitting data and other relevant information.

The transmission of control signaling in a system based on the Hybrid Automatic Repeat reQuest (HARQ) is described below as an example. The HARQ is a mechanism associated with packet retransmission between the data transmitter and the data receiver. If the data transmitter is a base station, the data receiver is a terminal. If the data transmitter is a terminal, the data receiver is a base station. By taking downlink adaptive HARQ as an example, the transmission of control signaling is described below, where the transmitter is a base station and the receiver is a terminal.

The base station notifies the terminal of allocated physical resources and HARQ-related information through downlink control signaling, and transmits the downlink data to the terminal. The control signaling may include time frequency resource, modulation mode, payload size, HARQ process number, Redundancy Version (RV), and New Data Indicator (NDI).

If the control signaling received by the terminal is erroneous, Discontinuous Transmission (DTX) is executed, namely, a DTX message is returned to the base station. Upon detecting the DTX fed back by the terminal, the base station sends downlink control signaling again and transmits packets.

If the control signaling received by the terminal is correct, the terminal receives packets as indicated by the control signaling. After receiving the packets correctly, the terminal returns a success acknowledgement (ACK) message to the base station, indicating that the current packet is received correctly. Subsequently, the base station sends the control signaling corresponding to the next packet, and sends the next packet. If the terminal fails to receive the packet correctly, the terminal returns a packet transmission failure acknowledgement, namely, Negative ACKnowledgement (NACK) message, to the base station, and the base station retransmits the control signaling and the packet which is not received by the terminal correctly.

The data transmitter can retransmit the packet for a limited number of times. If a packet is retransmitted for a threshold number of times but is still not received by the receiver successfully, the packet is referred to the upper layer.

In the foregoing process, for every attempt of transmitting the packet from the base station, no matter whether it is initial transmission or retransmission, the base station notifies the terminal through downlink control signaling.

The sent control signaling includes the fields such as physical resource indication, NDI, payload size, and RV. When a new packet is transmitted initially, the NDI value is different from that on the previous occasion. Specifically, if the value range of the NDI is 0 or 1, the NDI changes from 0 to 1, or from 1 to 0, when a new packet is transmitted initially. The value of RV is generally the default value in the initial transmission. If the packet is retransmitted, the NDI value is the same as that in the previous transmission, and the RV value changes. In this example, the RV is marked RV1 when the packet is retransmitted for the first time, marked RV2 when the packet is retransmitted for the second time, marked RV3 when the packet is retransmitted for the third time, marked RV4 when the packet is retransmitted for the fourth time, and so on. In the initial transmission and retransmission of the same packet, the payload size is the same. That is, the payload size needs to be indicated only in the initial transmission.

FIG. 1 is an exemplary signaling flow in a downlink adaptive HARQ process. As shown in FIG. 1, the process is as follows:

Step 101: The base station sends control signaling corresponding to the packet, and sends the packet initially (illustrated by dotted line 101 in FIG. 1), supposing that the control signaling indication NDI=0. The value of the payload size and the value of RV are indicated, and RV may adopt the default value.

Step 102: The terminal returns DTX. In this step, the terminal fails to receive the control signaling, and therefore, returns a DTX.

Step 103: The base station sends the control signaling again, and sends the packet initially (as illustrated by dotted line 103 in FIG. 1), where the value of NDI, the value of payload size, and the value of RV are the same as on the previous occasion, and the value of RV is the default value.

Step 104: The terminal returns a NACK message to the base station. In this step, the terminal receives the control signaling successfully, and therefore, the terminal receives the packet as indicated by the control signaling. If the terminal fails to receive the initially transmitted packet, the terminal returns a NACK to the base station.

Step 105: The base station sends control signaling corresponding to the retransmitted packet, and retransmits the packet (illustrated by dotted line 105 in FIG. 1). In this step, the packet is retransmitted for the first time. Therefore, in the control signaling, NDI=0, the value of the payload size is the same as that in the initial transmission, and the RV value is RV1 which is different from that on the previous occasion.

Afterwards, if the terminal still fails to receive the packet correctly, the base station keeps retransmitting the control signaling and the corresponding packet (as illustrated by step 106 and dotted line 106 in FIG. 1) until the threshold count of retransmission is reached. In the control signaling of retransmission, value of payload size is the same, and the RV changes. If the terminal still fails to receive the packet when the threshold count of retransmission is reached, the packet is referred to the upper layer.

Further, the base station sends control signaling of the new packet, and transmits the new packet. As shown in step 107 and dotted line 107, where the NDI in the control signaling is NDI=1 which is different from the NDI of the previous packet, the control signaling indicates the value of the payload size and the value of RV, and the value of the RV is the default value.

It is necessary to point out that the foregoing base station is a transmitter of the packet, and the terminal is a receiver of the packet. However, in the case of uplink data transmission, the data transmitter is a terminal, and the data receiver is a base station.

In the foregoing process, in the initial transmission of the packet, the RV in the corresponding control signaling may be a default value. The default value may not be indicated in the control signaling. Moreover, if the control signaling transmitted initially is received by the receiver successfully, namely, the receiver obtains the payload size successfully, the corresponding control signaling does not need to indicate the payload size again in the packet retransmission. That is, in the prior art, when the packet is transmitted initially and retransmitted, the control signaling needs to indicate both the RV and the payload size, and the RV indicated by the control signaling in the case of initially transmitting the packet and the payload size indicated by the control signaling in the case of retransmitting the packet are information not required to be indicated, which leads to waste of physical resources.

SUMMARY

A method and apparatus for sending control signaling are provided consistent with the embodiments disclosed herein to reduce waste of physical resources at the time of sending control signaling.

A method for sending control signaling in some embodiments may include: indicating, by the transmitter, a payload size or Redundancy Version (RV) through different states of one field in the control signaling; and sending the control signaling indicative of the payload size or RV on the field.

Accordingly, an apparatus for sending control signaling consistent with some embodiments may include multiple units, including, for example: a control signaling generating unit 111, adapted to generate control signaling, where different states of one field in the control signaling indicate a payload size or RV; and a control signaling sending unit 112, adapted to send the control signaling indicative of the payload size or RV on the field.

The technical solution consistent with some embodiments may provide different states of one field in the control signaling indicate the payload size or RV. At the time of sending the control signaling, the payload size or RV sent, may be indicated in the field, thus vacating the field occupied by the information not required to be indicated, and saving physical resources.

DETAILED DESCRIPTION

A method for sending control signaling is provided in embodiments disclosed herein, including: indicating payload size or RV based on different states of one field in the control signaling; and sending, in response to the indication, the control signaling indicative of the payload size or RV in the field, thus vacating the field occupied by the information not required to be indicated, and saving physical resources.

In the initial transmission of the packet, the RV in the corresponding control signaling may be a default value. The default value may not be indicated in the control signaling. Moreover, if the control signaling transmitted initially is received by the receiver successfully, namely, the receiver obtains the payload size successfully, the corresponding control signaling does not need to indicate the payload size again in the packet retransmission. In tact, every transmission of a packet may be either an initial transmission or a retransmission. Therefore, the control signaling in every transmission may indicate either payload size or RV.

Accordingly, the embodiments disclosed herein are described below. In order to make the technical solution clearer to those skilled in the art, the technical solution is hereinafter described in detail by reference to embodiments and accompanying drawings.

Figure 1:
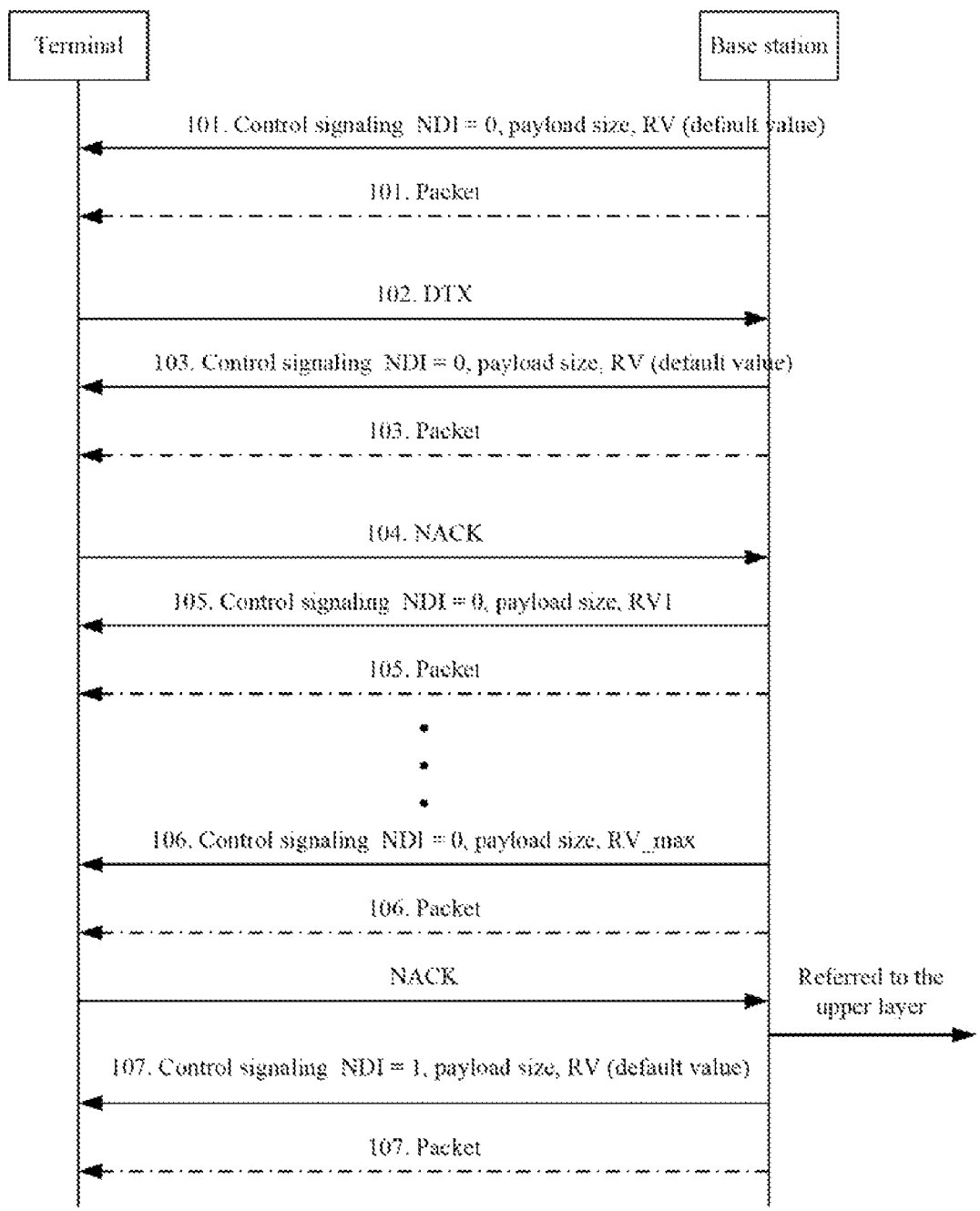
FIG. 1 is an exemplary signaling flowchart of HARQ in the prior art.
Figure 2:
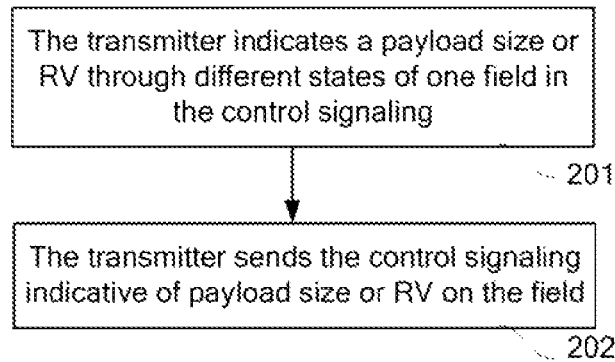
FIG. 2 is an exemplary flowchart consistent with some embodiments of the present disclosure.

FIG. 2 is an exemplary flowchart consistent with some embodiments. As shown in FIG. 2, the process may include the following steps.

Step 201: Different states of one field in the control signaling may indicate a payload size or RV.

Specifically, this step is to specify which states of the field indicate the payload size, and which states indicate the RV. It is appropriate that some states of the field indicate the payload size, and the remaining states indicate the RV. A corresponding relation exists between the physical resource, transmission format (Modulation Code Style (MCS)), and payload size. Therefore, the corresponding payload size may be determined based on the allocated physical resources and transmission format (MCS). If physical resources are indicated, the payload size may be indicated implicitly by indicating the transmission format (MCS).

Detailed description is given below, based on an example where the field indicative of the payload size occupies 6 bits and the field indicative of the RV occupies 2 bits. In this embodiment, the RV exists in a total of 4 states ($2^2=4$). Therefore, the field indicative of the RV occupies 2 bits. The payload size exists in a total of 60 states, but $2^5=32$ which is not enough for indicating 60 states. Considering $2^6=64$, the field for indicating the payload size needs to occupy 6 bits. Therefore, a 6-bit field is capable of indicating 64 states in total, 4 of the 64 states indicate the RV, and the remaining 60 states indicate the payload size. In this way, a 6-bit field is enough for indicating both the payload size and the RV. The 2 bits occupied by the RV in the prior art are saved in the present embodiments.

For ease of identification, in a 6-bit field, 4 states whose foremost upper bits are all 0s can indicate 4 different RVs. That is, the 4 states 000000, 000001, 000010 and 000011 indicate RV1-RV4. Accordingly, the remaining 60 states (any bit in the 4 foremost upper bits of the remaining 60 states is non-zero) indicate 60 different payload sizes. Therefore, when the control signaling is received, it is practicable to judge whether the field in the control signaling indicates the payload size or the RV by only detecting the state code.

The foregoing example shows that different states of one field in the control signaling are enough for indicating all values of the payload size and RV.

Step 202: The transmitter sends the control signaling indicative of the payload size or RV in the field. That is, the control signaling indicative of the payload size or RV in the field is sent to the receiver.

Specifically, this step may help determine whether the field of the control signaling to be sent indicates the payload size or RV, fill the field of the control signaling according to the specific payload size or RV, and send the control signaling. For example, in the initial transmission of the packet, the transmitter sends the control signaling indicative of the payload size on the same field to the receiver. Upon detecting a DTX, the transmitter sends the control signaling indicative of the payload size or RV on the same field. Upon detecting a NACK, the transmitter sends the control signaling indicative of the RV on the same field.

Upon detecting an ACK, the transmitter transmits a new packet initially, the field in the corresponding control signaling bears the payload size, and the default value of the RV applies.

When the control signaling received by the receiver is erroneous, a DTX message is returned. Accordingly, after receiving the DTX message, the transmitter sends the control signaling again to start retransmission of the packet. Generally, it is practicable to determine whether the field in the control signaling indicates the payload size or RV according to whether the count of transmission of the packet reaches a pre-defined value. If the count of transmission of the packet reaches or exceeds the pre-defined value, it is determined that the terminal obtains the payload size successfully in the previous transmission process. Therefore, the transmitter may indicate the RV on the foregoing field in the next signaling transmission. If the count of transmission of the packet does not reach the pre-defined value, the control signaling transmitter indicates the payload size on the field in the next signaling transmission.

If the receiver receives the control signaling correctly without receiving the corresponding packet correctly, the receiver returns a NACK message. Upon detecting the NACK message, the transmitter sends the control signaling to the receiver again. The field in the control signaling indicates the RV. Accordingly, the transmitter retransmits the packet after sending the control signaling.

Described above is a process in which the transmitter sends control signaling to the receiver and sends a packet to the receiver, and the receiver receives the packet according to the control signaling. After the transmitter sends the control signaling to the receiver, the receiver may also send data to the transmitter according to the control signaling. It is worthy of attention that the foregoing transmitter may be a base station, and the receiver may be a terminal. That is, in the downlink transmission, the base station sends downlink control signaling and a packet to the terminal, and the terminal receives the packet from the base station according to the downlink control signaling. Likewise, in the uplink transmission, the terminal can send a packet to the base station to perform uplink data transmission according to the downlink control signaling sent by the base station.

Taking downlink data transmission as an example, the foregoing embodiment applied in different scenarios is described below.

Figure 3:
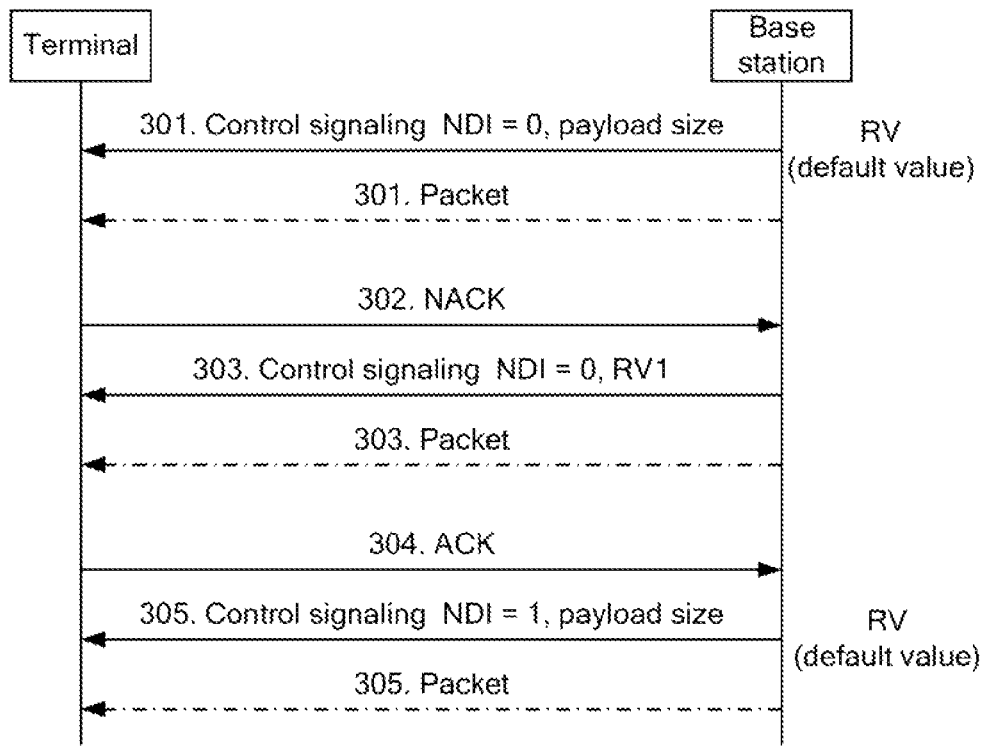
FIG. 3 is an exemplary signaling flowchart in scenario 1 consistent with some embodiments of the present disclosure.

Scenario 1: FIG. 3 is an exemplary signaling flowchart in scenario 1 consistent with some embodiments.

Step 301: The base station sends the control signaling corresponding to the packet initially and sends the packet (as illustrated by dotted line 301 in FIG. 3), where the NDI=0 in the control signaling. The state on a specific field in the control signaling is used to indicate the payload size, and the default value of the RV applies. The specific field may be any field applicable for indicating the payload size or RV in the control signaling. In the following scenarios, the specific field may be obtained in the same way as in this scenario.

Step 302: The terminal fails to receive the packet, and returns a NACK.

Step 303: The base station sends the control signaling again, and retransmits the packet (as illustrated by dotted line 303 in FIG. 3), where NDI=0 in the control signaling. A state on the specific field indicates the RV1.

Step 304: The terminal receives the packet successfully, and returns an ACK.

Step 305: The base station sends the control signaling of a new packet (namely, the next packet) and the new packet initially, where the NDI=1 in the control signaling. A state on the specific field indicates the payload size, and the default value of the RV applies.

Figure 4:
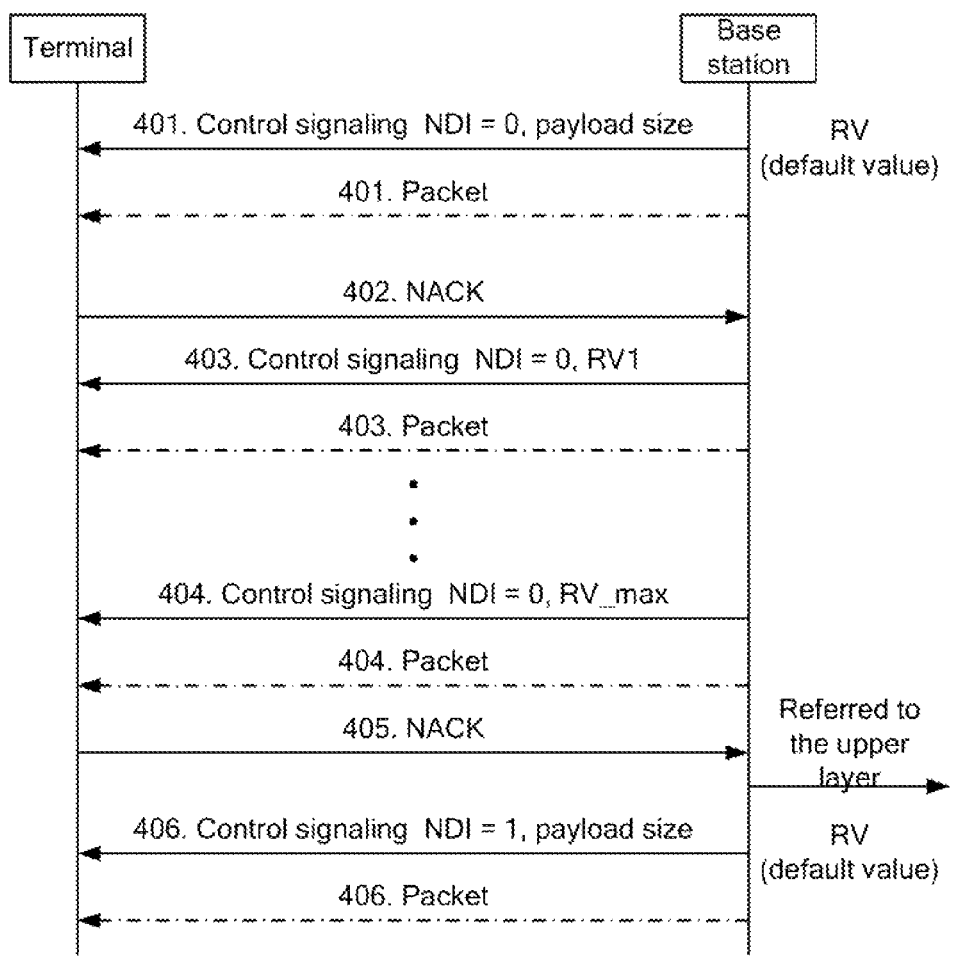
FIG. 4 is an exemplary signaling flowchart in scenario 2 consistent with some embodiments of the present disclosure.

Scenario 2: FIG. 4 is an exemplary signaling flowchart in scenario 2 consistent with some embodiments of the present invention.

Step 401: The base station sends the control signaling corresponding to the packet initially and sends the packet (as illustrated by dotted line 401 in FIG. 4), where the NDI=0 in the control signaling. A state on the specific field in the control signaling indicates the payload size, and the default value of the RV applies.

Step 402: The terminal fails to receive the packet, and returns a NACK.

Step 403: The base station sends the control signaling again, and retransmits the packet (as illustrated by dotted line 403 in FIG. 3), where NDI=0 in the control signaling. A state on the specific field indicates the RV1. In the subsequent retransmission process, the terminal fails to receive the packet.

Step 404: The base station sends the control signaling corresponding to the packet in a last attempt, and retransmits the packet (as illustrated by dotted line 404 in FIG. 3), where NDI=0 in the control signaling. A state on the specific field indicates the RV_max, where RV_max indicates the RV at the maximum retransmission count.

Step 405: The terminal fails to receive the packet, and returns a NACK.

Because the maximum retransmission count is reached, the packet is referred to the upper layer.

Step 406: The base station sends the control signaling corresponding to a new packet (namely, the next packet) initially and sends the new packet, where the NDI=1 in the control signaling. A state on the specific field indicates the payload size, and the default value of the RV applies.

Figure 5A:
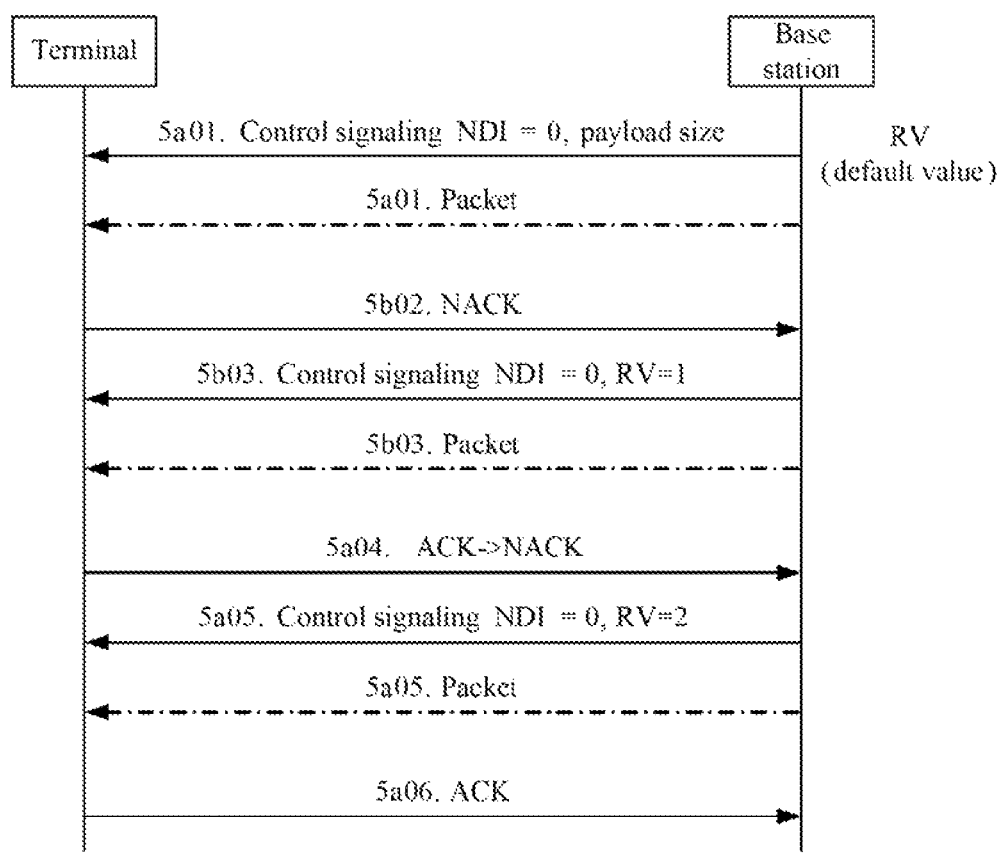
FIG. 5 (FIG. 5a and FIG. 5b) is an exemplary signaling flowchart in scenario 3 consistent with some embodiments of the present disclosure.
Figure 5B:
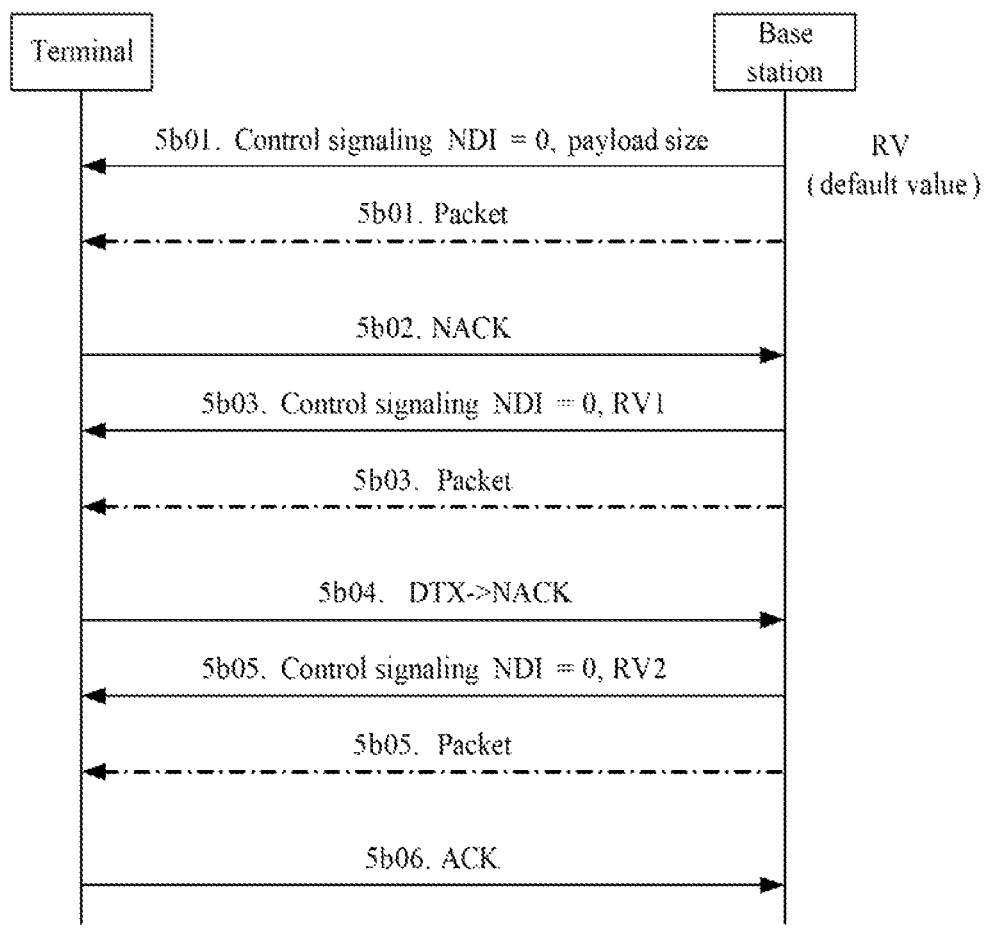

Scenario 3: In this scenario, the information returned by the terminal is mistaken as a NACK by the base station, and the retransmission count does not reach the maximum retransmission count. As shown in FIG. 5a, the ACK is mistaken as NACK. As shown in FIG. 5b, the DTX is mistaken as NACK in the retransmission process.

FIG. 5a illustrates the following steps:

Step 5a01: The base station sends the control signaling corresponding to the packet initially and sends the packet (as illustrated by dotted line 5a01), where the NDI=0 in the control signaling. A state on the specific field in the control signaling indicates the payload size, and the default value of the RV applies.

Step 5a02: The terminal fails to receive the packet, and returns a NACK.

Step 5a03: The base station sends the control signaling again, and retransmits the packet (as illustrated by dotted line 5a03), where NDI=0 in the control signaling. A state on the specific field indicates the RV1.

Step 5a04: The terminal receives the packet successfully, and therefore, returns an ACK, which is mistaken as NACK by the base station.

Step 5a05: The base station sends the control signaling again, and retransmits the packet (as illustrated by dotted line 5a05), where NDI=0 in the control signaling. A state on the specific field indicates the RV2.

Step 5a06: The terminal receives the packet successfully, and therefore, returns an ACK.

As regards the scenario shown in FIG. 5b, in step 5b04, the terminal fails to receive the control signaling and returns a DTX, which is mistaken as NACK by the base station. The remaining steps are the same as the counterpart in FIG. 5a, and are not repeated here any further.

Figure 6A:
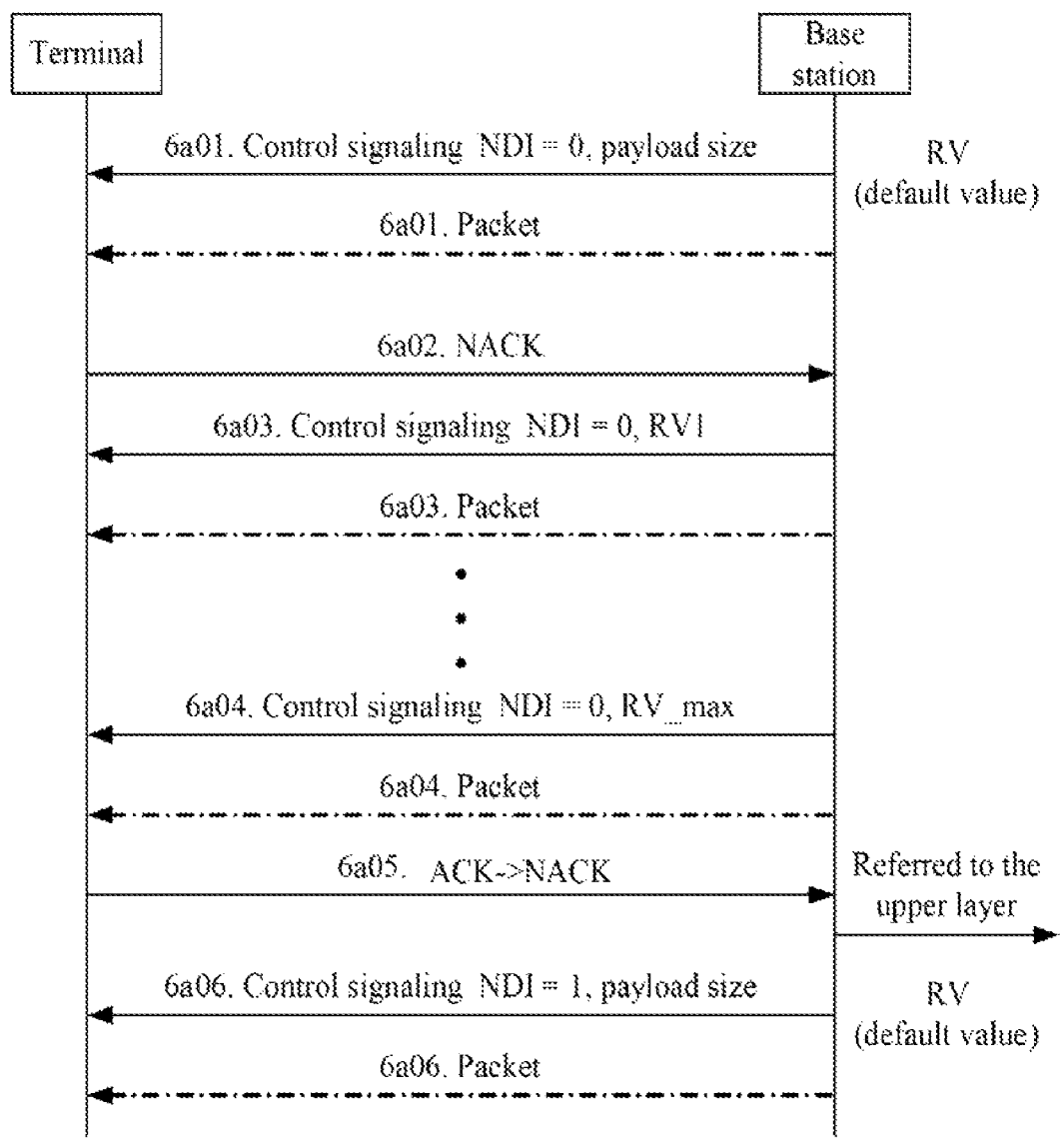
FIG. 6 (FIG. 6a and FIG. 6b) is an exemplary signaling flowchart in scenario 4 consistent with some embodiments of the present disclosure.
Figure 6B:
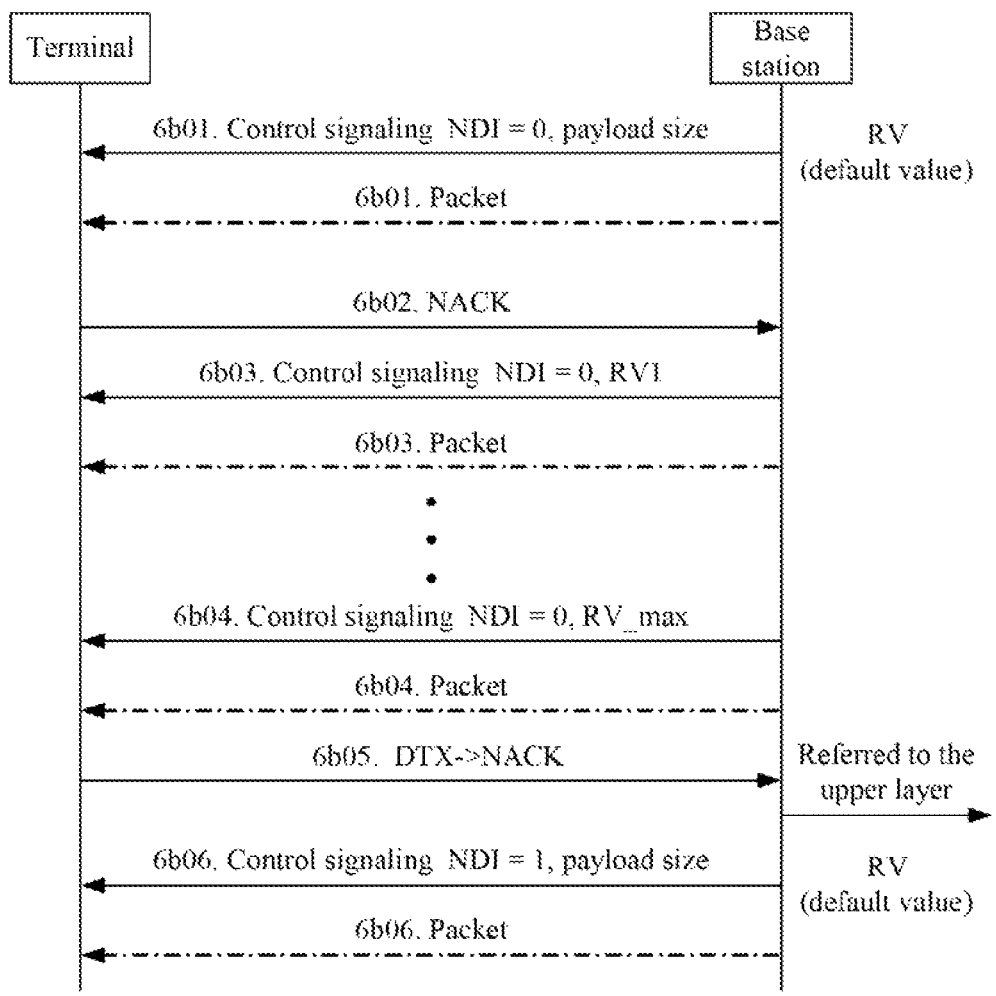

Scenario 4: In this scenario, the information returned by the terminal is mistaken as a NACK by the base station when the retransmission count reaches the maximum retransmission count. As shown in FIG. 6a the ACK is mistaken as NACK. As shown in FIG. 6b, the DTX is mistaken as NACK.

FIG. 6a illustrates the following steps:

Step 6a01: The base station sends the control signaling corresponding to the packet initially and sends the packet (as illustrated by dotted line 6a01), where the ND=0 in the control signaling. A state on the specific field in the control signaling indicates the payload size. The default value of the RV applies.

Step 6a02: The terminal fails to receive the packet, and therefore, returns a NACK.

Step 6a03: The base station sends the control signaling again, and retransmits the packet (as illustrated by dotted line 6a03), where NDI=0 in the control signaling. A state on the specific field indicates the RV1.

In the subsequent retransmission process, the terminal fails to receive the packet.

Step 6a04: The base station sends the control signaling corresponding to the packet at the last attempt, and retransmits the packet (as illustrated by dotted line 6a04), where NDI=0 in the control signaling. A state on the specific field indicates the RV_max.

Step 6a05: The terminal receives the packet successfully, and therefore, returns an ACK, which is mistaken as NACK by the base station.

Because the maximum retransmission count is reached, the packet is referred to the upper layer.

Step 6a06: The base station sends the control signaling corresponding to a new packet (namely, the next packet) initially and sends the new packet (illustrated by dotted line 6a06), where the NDI=1 in the control signaling. A state on the specific field indicates the payload size. The default value of the RV applies.

Based on the scenario shown in FIG. 6b, in step 6b05, the terminal fails to receive the control signaling and returns a DTX, which is mistaken as NACK by the base station. The remaining steps may be similar to the counterpart in FIG. 6a, and are not repeated here any further.

Figure 7A:
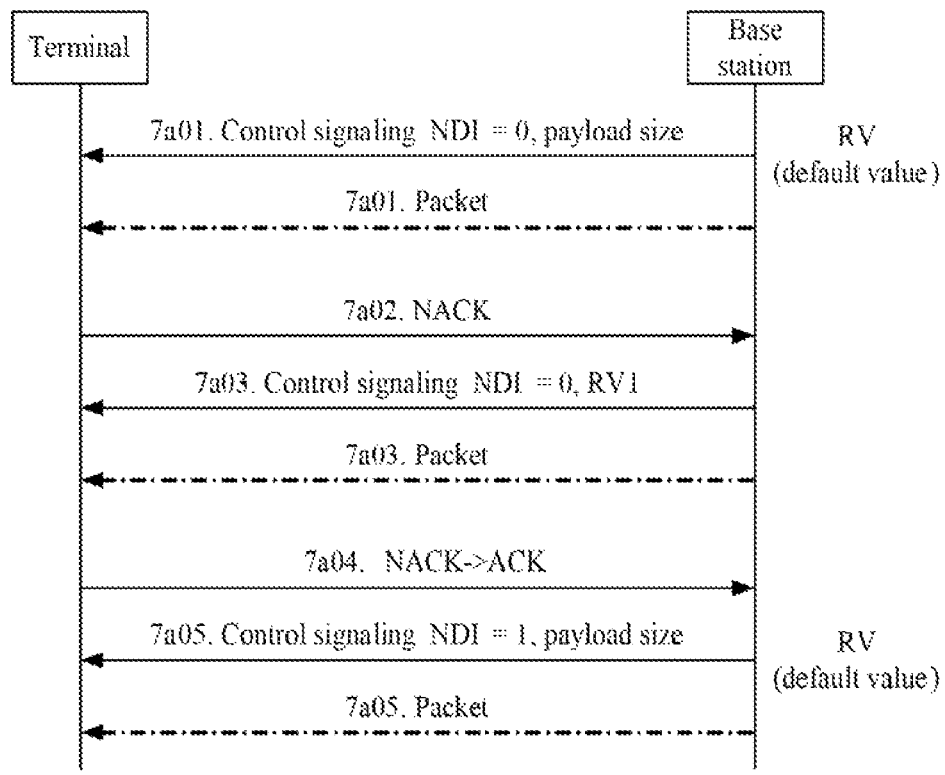
FIG. 7 (FIG. 7a and FIG. 7b) is an exemplary signaling flowchart in scenario 5 consistent with some embodiments of the present disclosure.
Figure 7B:
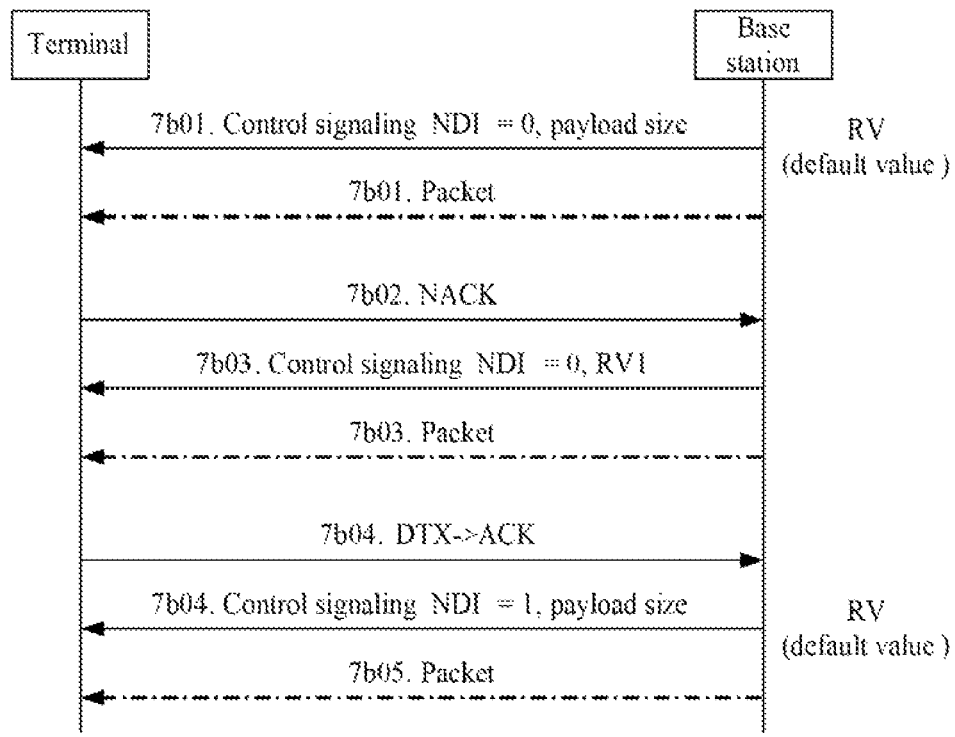

Scenario 5: In this scenario, the information returned by the terminal is mistaken as an ACK by the base station, and in response, the base station transmits a new packet. As shown in FIG. 7a, the NACK is mistaken as ACK. As shown in FIG. 7b, the DTX is mistaken as ACK.

FIG. 7a illustrates the following steps:

Step 7a01: The base station sends the control signaling corresponding to the packet initially and sends the packet (as illustrated by dotted line 7a01), where the NDI=0 in the control signaling. A state on the specific field in the control signaling indicates the payload size, and the default value of the RV applies.

Step 7a02: The terminal fails to receive the packet, and therefore, returns a NACK.

Step 7a03: The base station sends the control signaling again, and retransmits the packet (as illustrated by dotted line 7a03), where NDI=0 in the control signaling. A state on the specific field indicates the RV1.

Step 7a04: The terminal fails to receive the packet, and therefore, returns a NACK, which is mistaken as ACK by the base station.

Step 7a05: The base station sends the control signaling corresponding to a new packet initially and sends the new packet (as illustrated by dotted line 7a05), where the NDI=1 in the control signaling. A state on the specific field indicates the payload size, and the default value of the RV applies.

With respect to the scenario shown in FIG. 7b, in step 7b04, the terminal fails to receive the control signaling and returns a DTX, which is mistaken as ACK by the base station. The remaining steps are the same as the counterpart in FIG. 7a, and are not repeated here any further.

Figure 8:
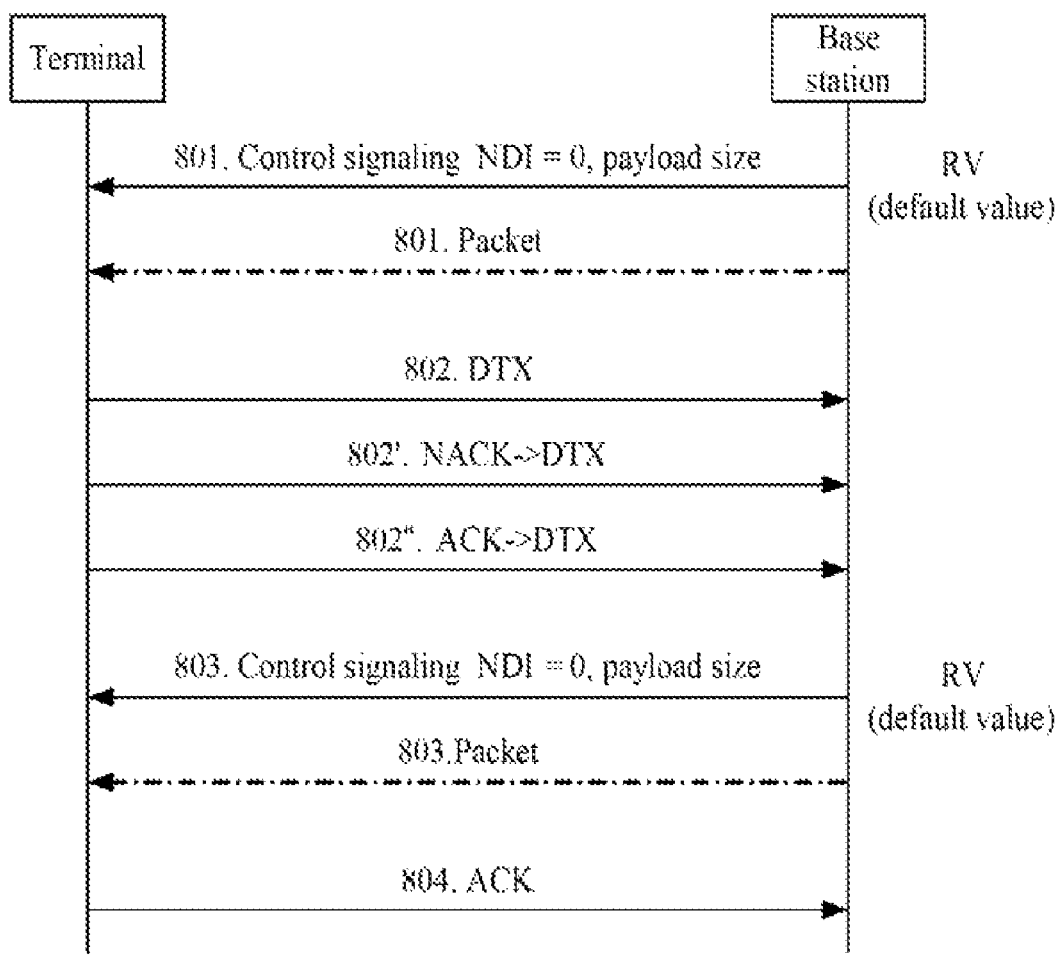
FIG. 8 is an exemplary signaling flowchart in scenario 6 consistent with some embodiments of the present disclosure.

Scenario 6: In this scenario, the base station receives a DTX returned by the terminal in the process of transmitting the packet initially. As shown in FIG. 8, the DTX may indicate an error of the initially transmitted control signaling, or the terminal that transmits the packet initially returns a NACK which is mistaken as DTX by the base station, or the terminal that transmits the packet initially returns an ACK which is mistaken as DTX by the base station.

Step 801: The base station sends the control signaling corresponding to the packet initially and sends the packet (as illustrated by dotted line 801), where the NDI=0 in the control signaling. A state on the specific field in the control signaling indicates the payload size. The default value of the RV applies.

Step 802: The terminal fails to receive the control signaling, and therefore, returns a DTX.

An alternative of this step may include the steps where, the terminal receives the control signaling successfully but fails to receive the data. The terminal returns a NACK which is mistaken as DTX by the base station, as described in step 802'.

Another alternative of this step may include, the terminal receives the control signaling and data successfully. The terminal returns an ACK which is mistaken as DTX by the base station, as described in step 802".

Step 803: The base station sends the control signaling again and retransmits the packet (as illustrated by dotted line 803), where the NDI=0 in the control signaling. A state on the specific field indicates the payload size. The default value of the RV may apply.

Step 804: The terminal receives the packet successfully, and therefore, returns an ACK message.

Scenario 7: In this scenario, in the process of retransmitting the packet, the base station receives a DTX returned by the terminal and the maximum retransmission count is not reached. Therefore, the base station sends the control signaling again and retransmits the packet, where the NDI=0 in the control signaling. A state on the specific field in the control signaling indicates the payload size, and the default value of the RV applies; or a state on the field indicates the RV.

Figure 9A:
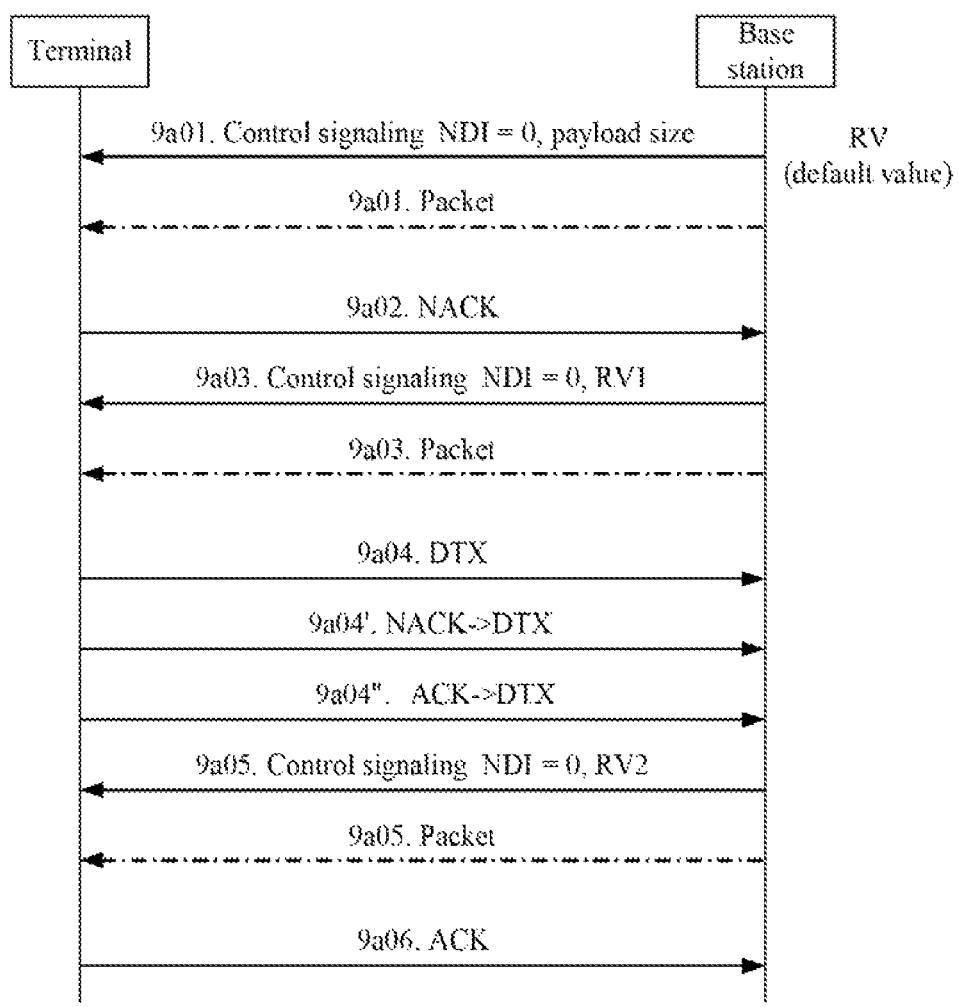
FIG. 9 (FIG. 9a and FIG. 9b) is an exemplary signaling flowchart in scenario 7 consistent with some embodiments of the present disclosure.
Figure 9B:
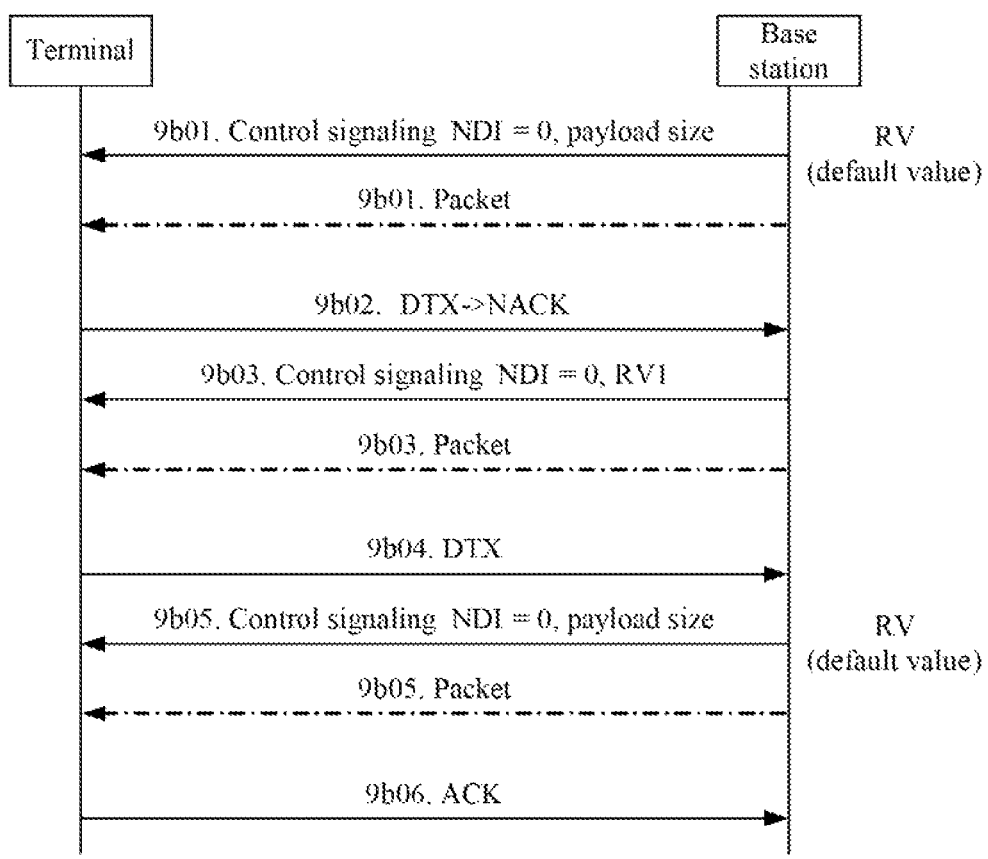

The scenario may be divided into two circumstances, as shown in FIG. 9*a* and FIG. 9*b* respectively.

FIG. 9*a* illustrates the following steps:

Step 9*a*01: The base station sends the control signaling corresponding to the packet initially and sends the packet (as illustrated by dotted line 9*a*01), where the NDI=0 in the control signaling. A state on the specific field indicates the payload size. The default value of the RV applies.

Step 9*a*02: The terminal fails to receive the packet, and therefore, returns a NACK.

Step 9*a*03: The base station sends the control signaling again, and retransmits the packet (as illustrated by dotted line 9*a*03), where NDI=0 in the control signaling. A state on the specific field indicates the RV1.

Step 9*a*04: The terminal fails to receive the control signaling, and therefore, returns a DTX.

An alternative of this step may include that the terminal fails to receive the packet, and therefore, returns a NACK, which is mistaken as DTX by the base station, as described in step 9*a*04'.

Another alternative of this step may include that the terminal receives the packet successfully, and therefore, returns an ACK, which is mistaken as DTX by the base station, as described in step 9*a*04".

Step 9*a*05: The terminal obtains the payload size correctly beforehand in the foregoing steps 9*a*04, 9*a*04' and 9*a*04". Therefore, in step 9*a*05, when the base station sends the control signaling, it is not necessary to send the payload size again, but the RV2 is sent instead. A state on the specific field indicates the RV2, and the packet is retransmitted (as illustrated by dotted line 9*a*05).

Step 9*a*06: The terminal receives the packet correctly, and therefore, returns an ACK.

FIG. 9*b* illustrates the following steps:

Step 9*b*01: The base station sends the control signaling corresponding to the packet initially and sends the packet (as illustrated by dotted line 9*b*01), where the NDI=0 in the control signaling. A state on the specific field in the control signaling indicates the payload size. The default value of the RV applies.

Step 9*b*02: The terminal fails to receive the control signaling, and therefore, returns a DTX, which is mistaken as NACK by the base station.

Step 9*b*03: The base station sends the control signaling again, and retransmits the packet (as illustrated by dotted line 9*b*03), where NDI=0 in the control signaling. A state on the specific field indicates the RV1.

Step 9*b*04: The terminal returns a DTX.

In this step, the terminal may receive the control signaling successfully or not. In either case, the terminal may not receive the retransmitted packet because the control signaling carries no payload size message even if the control signaling is received successfully, and no payload size message is obtained from the previous control signaling.

Step 9*b*05: The base station sends the control signaling again and retransmits the packet (as illustrated by dotted line 9*b*05), where the NDI=0 in the control signaling. A state on the specific field indicates the payload size. The default value of the RV may apply.

Step 9*b*06: The terminal receives the control signaling and packet successfully, and therefore, returns an ACK.

The scenarios 9a and 9b may reveal that when the base station receives a DTX returned by the terminal, a state on the field in the control signaling to be transmitted next time indicates the payload size or RV.

The base station may determine whether the field in the control signaling to be transmitted next time indicates the RV rather than the conventional payload size according to whether the count of transmission of the packet reaches a pre-defined value. Generally, if the count of transmission of the packet reaches or exceeds the pre-defined value, it is determined that the terminal obtains the payload size successfully in the previous transmission process. Therefore, the base station may let the field carry the RV in the next signaling transmission.

Figure 10:
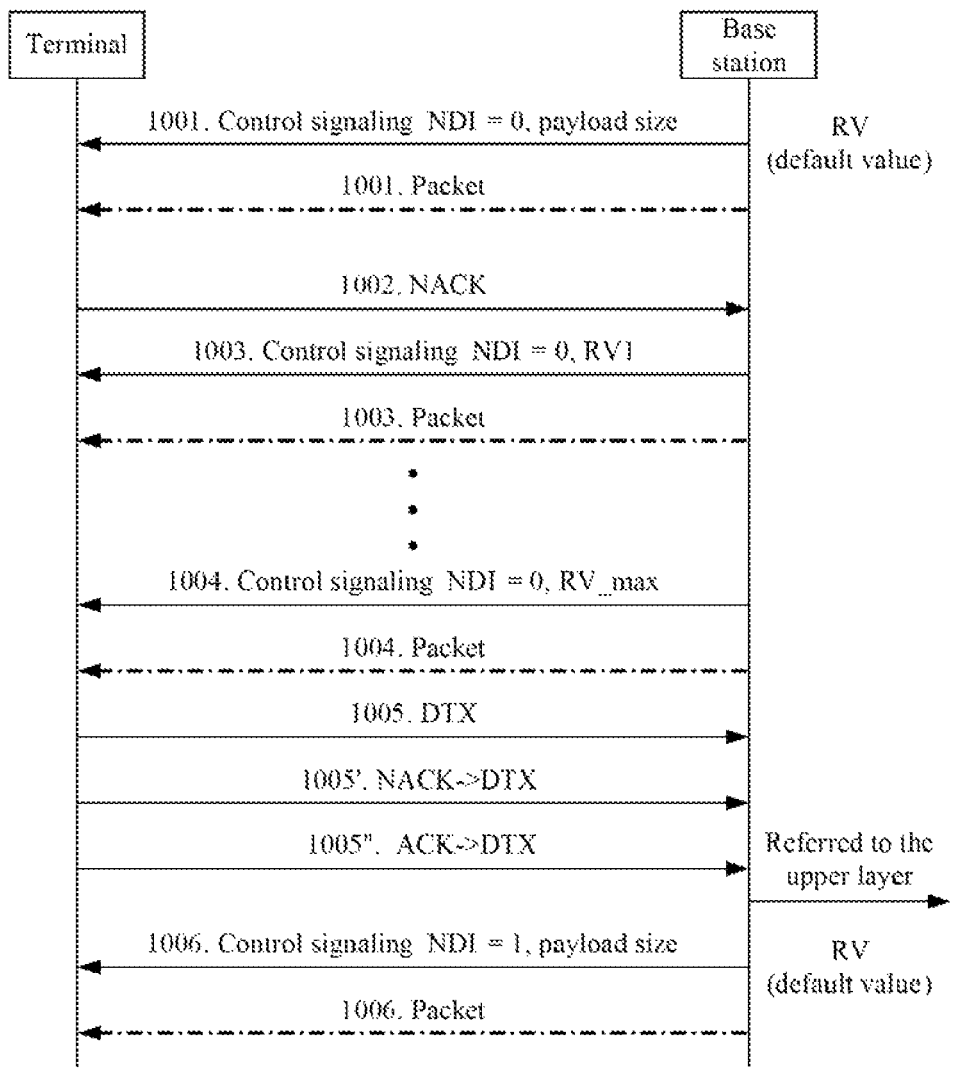
FIG. 10 is an exemplary signaling flowchart in scenario 8 consistent with some embodiments of the present disclosure.

Scenario 8: In this scenario, when the maximum retransmission count is reached in the retransmission process, the base station receives a DTX returned by the terminal, and therefore, transmits a new packet, as shown in FIG. 10:

Step 1001: The base station sends the control signaling corresponding to the packet initially and sends the packet (as illustrated by dotted line 1001), where the NDI=0 in the control signaling. A state on the specific field in the control signaling indicates the payload size. The default value of the RV applies.

Step 1002: The terminal fails to receive the packet, and therefore, returns a NACK.

Step 1003: The base station sends the control signaling again, and retransmits the packet (as illustrated by dotted line 1003), where NDI=0 in the control signaling. A state on the specific field indicates the RV1.

In the subsequent retransmission process, the terminal fails to receive the packet.

Step 1004: The base station sends the control signaling corresponding to the packet at the last attempt, and retransmits the packet (as illustrated by dotted line 1004), where NDI=0 in the control signaling. A state on the specific field indicates the RV_max.

Step 1005: The terminal fails to receive the control signaling, and therefore, returns a DTX.

An alternative of this step may include that the terminal fails to receive the packet, and therefore, returns a NACK, which is mistaken as DTX by the base station, as described in step 1005'.

Another alternative of this step may include that the terminal receives the packet successfully, and therefore, returns an ACK, which is mistaken as DTX by the base station, as described in step 1005".

Under any situation, the packet is referred to the upper layer subsequently.

Step 1006: The base station sends the control signaling corresponding to a new packet initially and sends the new packet, where the NDI=1 in the control signaling. A state on the specific field indicates the payload size. The default value of the RV applies.

Eight scenarios of applying the embodiments of the present invention are described above, taking downlink data transmission as an example. In practice, the method under the present invention may be applicable to uplink data transmission as well.

The foregoing embodiments of the present invention reveal that different states of one field in the control signaling may indicate the payload size or RV. At the time of sending the control signaling, the payload size or RV that is sent is indicated on the specific field, thus vacating the field occupied by the information not required to be indicated, and saving physical resources.

Figure 11:
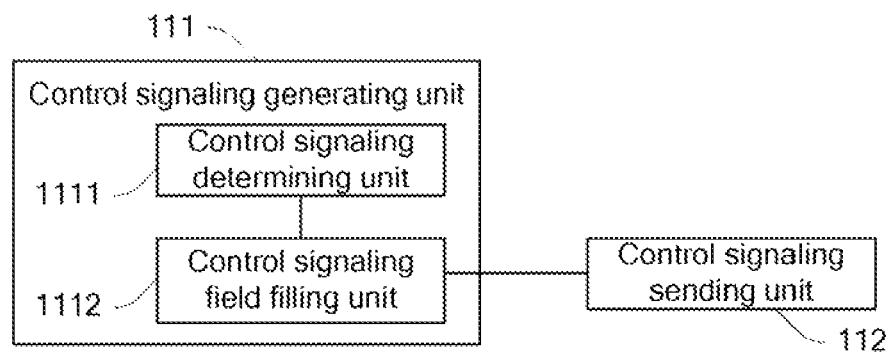
FIG. 11 is an exemplary block diagram of an apparatus consistent with some embodiments of the present disclosure.

An apparatus for sending control signaling consistent with some embodiments is described below. FIG. 11 is a block diagram of the apparatus. The apparatus may include multiple units, including, for example: a control signaling generating unit 111, adapted to generate control signaling, where different states of one field in the control signaling indicate the payload size or RV; and a control signaling sending unit 112, connected with the control signaling generating unit 111 and adapted to send the control signaling indicative of the payload size or RV on the field.

The control signaling generating unit 111 may further include: a control signaling determining unit 1111, adapted to determine whether the data that needs to be indicated on the field of the sent control signaling is payload size or RV; and a control signaling field filling unit 1112, adapted to fill the field of the control signaling according to the payload size or RV determined by the control signaling determining unit 1111. The control signaling determining unit 1111 determines that the data to be indicated on the field of the control signaling is a payload size if the packet is transmitted initially. The control signaling determining unit 1111 determines that the data to be indicated on the field of the control signaling is an RV if the packet transmission count reaches or exceeds a pre-defined value when DTX is detected; and determines that the data to be indicated on the field of the control signaling is a payload size if the packet transmission count does not reach the pre-defined value in the retransmission process. The control signaling determining unit 1111 determines that the data to be indicated on the field of the control signaling is an RV if data transmission failure is detected.

The apparatus may be integrated in the transmitter of the control signaling, for example, in a base station. In case where the transmitter may be a base station, the receiver may be a terminal.

The process of sending control signaling through the foregoing apparatus may be similar, and is not repeated here any further.

The foregoing embodiments may reveal that different states of one field in the control signaling may indicate the payload size or RV. At the time of sending the control signaling, the payload size or RV sent is indicated on the generated field, thus vacating the field occupied by the information not required to be indicated, and saving physical resources.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method of signaling, comprising:
   receiving, by a terminal, control signaling comprising a field, wherein the field includes N bits that are either 1 or 0, and a state of the field is indicated by all the N bits of the field; wherein N is a positive integer greater than 1; wherein the field is dynamically indicative of one of a payload size or a Redundancy Version (RV) through the state of the field, wherein the payload size is indicated through a first state of the field when the first state is within a first predetermined range and the RV is indicated through a second state of the field when the second state is within a 10 second predetermined range distinct from the first predetermined range; and
   sending, by the terminal, a packet according to the received control signaling to a base station (BS).

2. The method of claim 1, further comprising:
   determining, by the terminal, that the RV is a default value if the received control signaling is indicative of the payload size on the field.

3. The method of claim 1, wherein the receiving, by a terminal, control signaling comprises:
   receiving, by the terminal, the control signaling indicating the payload size on the field when the terminal receives a packet initially.

4. The method of claim 1, wherein the receiving, by a terminal, a control signaling comprises:
   sending, by the terminal, an detecting Discontinuous Transmission (DTX) to the BS;
   receiving, by the terminal, the control signaling indicative of the payload size or RV on the field from the BS.

5. The method of claim 4, wherein receiving, by the terminal, the control signaling indicative of the payload size or RV on the field comprises:
   receiving, by the terminal, the control signaling indicating the RV on the field of the control signaling to be received next time if a packet transmission count reaches or exceeds a pre-defined value; and
   receiving, by the terminal, the control signaling indicating the payload size on the field of the control signaling to be received next time if the packet transmission count does not reach the pre-defined value.

6. The method of claim 1, wherein the control signaling is received by the terminal from the BS.

7. An apparatus of signaling, comprising:
   a control signaling receiver, configured to receive control signaling comprising a field from a base station (BS), wherein the field includes N bits that are either 1 or 0, and a state of the field is indicated by all the N bits of the field, wherein N is a positive integer greater than 1; wherein the field is dynamically indicative of one of a payload size or a Redundancy Version (RV) through the state of the field, wherein the payload size is indicated through a first state of the field in the control signaling when the first state is within a first predetermined range and the RV is indicated through a second state of the field when the second state is within a second predetermined range distinct from the first predetermined range; and
   a transmitter, configured to send a packet according to the received control signaling to the BS.

8. The apparatus of claim 7, further comprising
   a processor, configured to determine that the RV is a default value if the received control signaling is indicative of the payload size on the field.

9. The apparatus of claim 8, wherein the apparatus is integrated into a terminal.

* * * * *

UNITED STATES PATENT AND TRADEMARK OFFICE
CERTIFICATE OF CORRECTION

| | |
|---|---|
| PATENT NO. | : 8,369,278 B2 |
| APPLICATION NO. | : 13/544238 |
| DATED | : February 5, 2013 |
| INVENTOR(S) | : Xianghua Wang and Xuan Feng |

It is certified that error appears in the above-identified patent and that said Letters Patent is hereby corrected as shown below:

In the Claims:

Claim 1, column 12, line 8, delete "10" after the text beginning with "state is with a" and before the text ending with "second predetermined range distinct"

Signed and Sealed this
Twenty-seventh Day of August, 2013

Teresa Stanek Rea
*Acting Director of the United States Patent and Trademark Office*